(12) United States Patent
Jensen

(10) Patent No.: US 10,502,190 B2
(45) Date of Patent: Dec. 10, 2019

(54) SUPPORT STRUCTURE OF A WIND TURBINE

(71) Applicant: Siemens Gamesa Renewable Energy A/S, Brande (DK)

(72) Inventor: Daniel Kai Jensen, Horsens (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 443 days.

(21) Appl. No.: 15/122,472

(22) PCT Filed: Nov. 12, 2014

(86) PCT No.: PCT/EP2014/074353
§ 371 (c)(1),
(2) Date: Aug. 30, 2016

(87) PCT Pub. No.: WO2015/144260
PCT Pub. Date: Oct. 1, 2015

(65) Prior Publication Data
US 2017/0067448 A1    Mar. 9, 2017

(30) Foreign Application Priority Data

Mar. 25, 2014   (EP) .................................... 14161510

(51) Int. Cl.
*F03D 13/20* (2016.01)
*F03D 13/10* (2016.01)

(52) U.S. Cl.
CPC .............. *F03D 13/20* (2016.05); *F03D 13/10* (2016.05); *F05B 2230/21* (2013.01);
(Continued)

(58) Field of Classification Search
CPC ........ F03D 13/20; F03D 13/10; F03D 1/0691; Y02P 70/523; F05B 2230/21;
(Continued)

(56) References Cited

U.S. PATENT DOCUMENTS 8,536,728 B2 * 9/2013 Mascioni ................ F03D 13/20
290/55
2011/0285143 A1   11/2011 Mascioni
(Continued)

FOREIGN PATENT DOCUMENTS

CN    103026061 A    4/2013
CN    103541869 A    1/2014
(Continued)

OTHER PUBLICATIONS

Extended European Search Report for EP Application No. 14151610.4, dated Sep. 10, 2014.
(Continued)

*Primary Examiner* — Jason D Shanske
*Assistant Examiner* — Eric J Zamora Alvarez
(74) *Attorney, Agent, or Firm* — Schmeiser, Olsen & Watts LLP

(57) ABSTRACT

A support structure of a wind turbine and a method of manufacturing the support structure is provided. A support structure of a wind turbine is disclosed, whereby the support structure includes a first end to connect to a rotor of a wind turbine, and a second end to be connected to a tower of a wind turbine. The support structure includes an intermediate part that connects the first end to the second end, and that the intermediate part includes the form of an elbow-shaped tube. The support structure is divided into at least two segments whereby the segments are transportable individually from a manufacturing site to a construction site. The segments are connectable in a way that the support structure is capable of transferring forces from the rotor to the tower.

5 Claims, 3 Drawing Sheets

(52) U.S. Cl.
CPC ....... *F05B 2230/50* (2013.01); *F05B 2230/60* (2013.01); *F05B 2240/14* (2013.01); *F05B 2260/02* (2013.01); *Y02E 10/728* (2013.01); *Y02P 70/523* (2015.11)

(58) Field of Classification Search
CPC .............. F05B 2230/50; F05B 2230/60; F05B 2240/14; F05B 2260/02; Y02E 10/728; F01D 25/24
USPC ...................................................... 416/244 R
See application file for complete search history.

(56) References Cited

U.S. PATENT DOCUMENTS

| | | | |
|---|---|---|---|
| 2011/0316278 A1 | 12/2011 | Siegfriedsen | |
| 2012/0315129 A1 | 12/2012 | Castell et al. | |
| 2013/0236304 A1* | 9/2013 | Moestrup | F01D 25/24 415/213.1 |
| 2013/0334819 A1* | 12/2013 | Fricke | F03D 1/0691 290/44 |
| 2014/0017090 A1 | 1/2014 | Andersen et al. | |
| 2014/0072430 A1* | 3/2014 | Borgen | F03D 1/06 416/62 |
| 2015/0016976 A1* | 1/2015 | Roer | F03D 15/20 415/182.1 |
| 2016/0131112 A1* | 5/2016 | Ayneto Pou | F03D 80/00 415/213.1 |

FOREIGN PATENT DOCUMENTS

| | | |
|---|---|---|
| EP | 2530300 A1 | 12/2012 |
| WO | 2013092502 A2 | 6/2013 |

OTHER PUBLICATIONS

International Search Report and Written Opinion for PCT Application No. PCT/EP2014/074353, dated Feb. 6, 2015.
Chinese Office Action for CN Application No. 201480077457.0 dated Aug. 21, 2018.

* cited by examiner

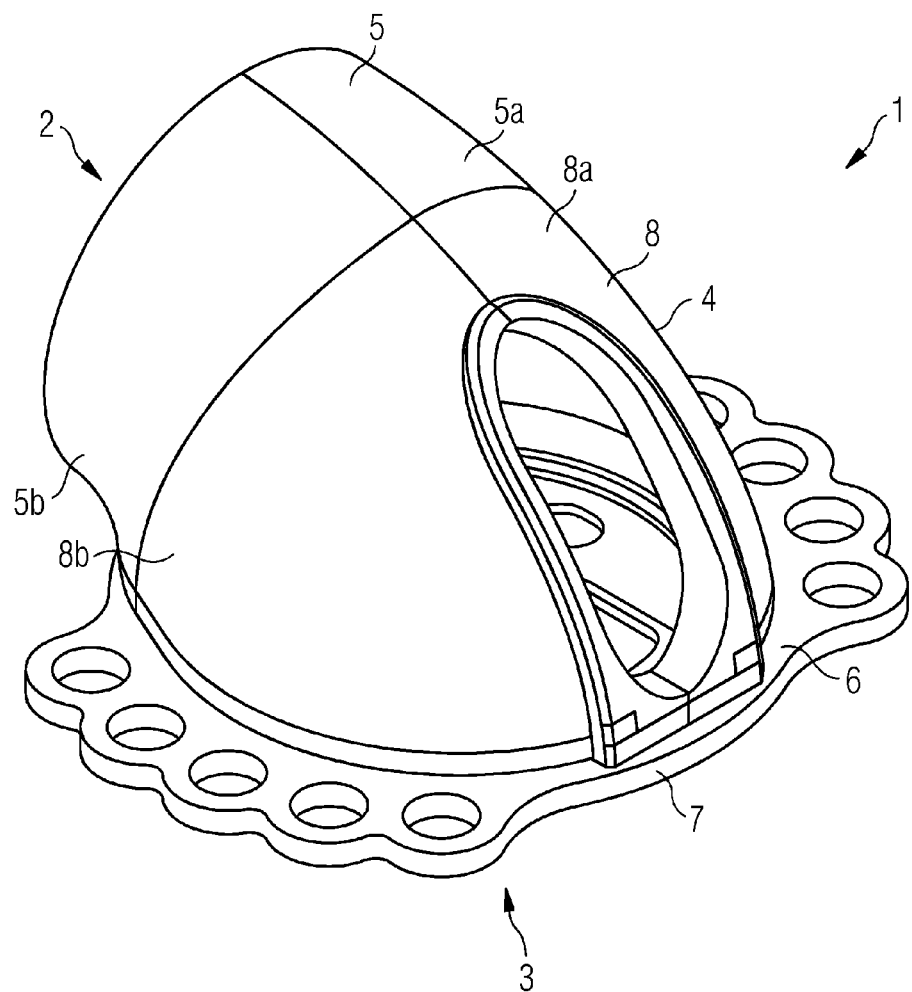

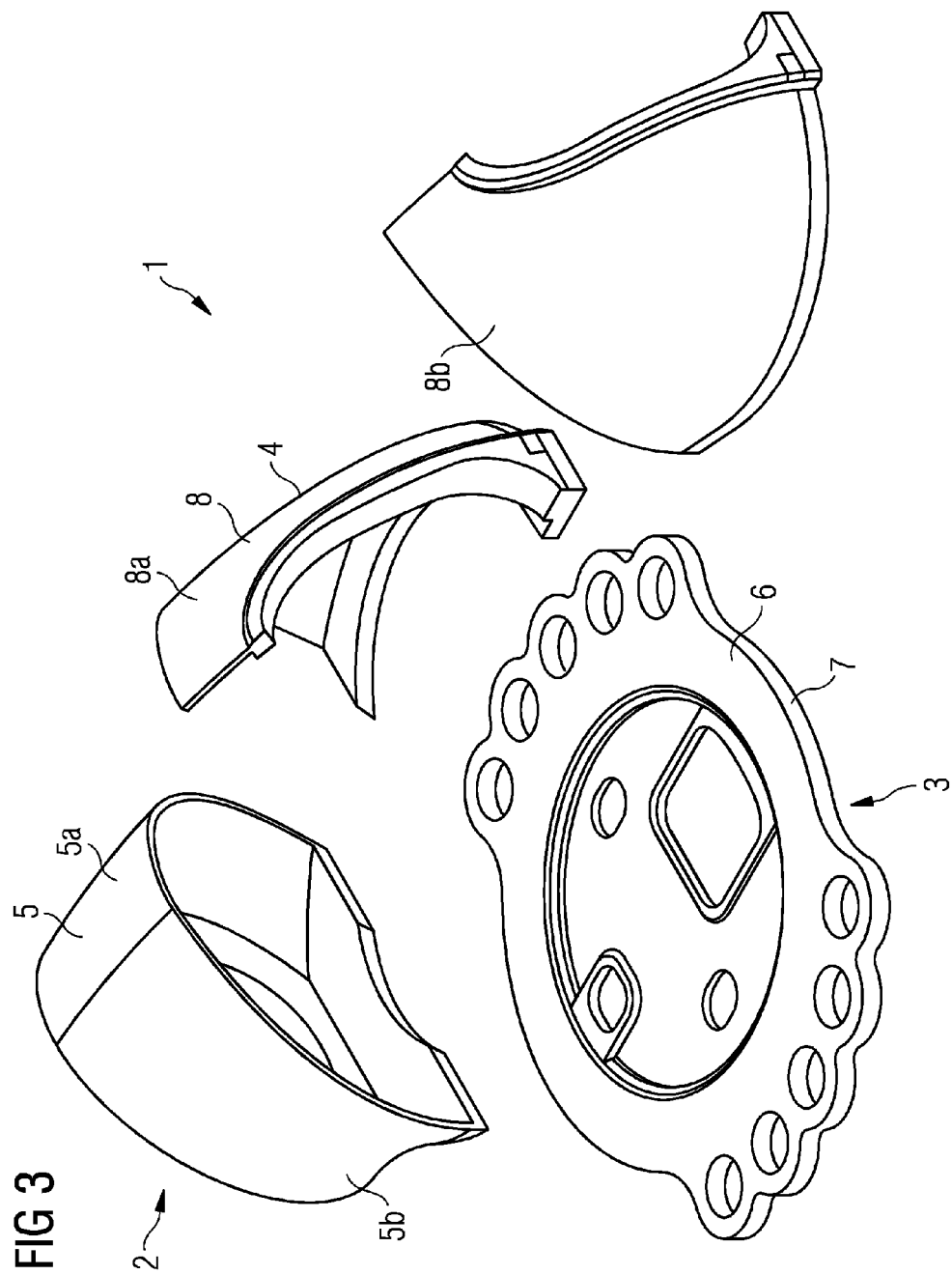

SUPPORT STRUCTURE OF A WIND TURBINE

CROSS-REFERENCE TO RELATED APPLICATIONS

This application claims priority to PCT Application No. PCT/EP2014/074353, having a filing date of Nov. 12, 2014, based off of European application No. EP 14161510.4 having a filing date of Mar. 25, 2014, the entire contents of which are hereby incorporated by reference.

FIELD OF TECHNOLOGY

The following relates to a support structure of a wind turbine and to a method of manufacturing the support structure.

BACKGROUND

A wind turbine comprises a tower, a nacelle and a wind turbine rotor with a hub and rotor blades. The wind turbine comprises an electric generator. The electric generator comprises a generator rotor and a generator stator. The hub with the rotor blades is connected to the rotor of the electric generator.

The nacelle of the wind turbine comprises a support structure. The rotor is attached to the support structure and the support structure is connected to the tower of the wind turbine. The support structure supports the generator and the rotor of the wind turbine on the tower.

The wind interacts with the rotor blades and causes a rotation of the hub and the rotor of the electric generator.

The wind induces loads and vibrations into the wind turbine. The loads and vibrations are transferred from the rotor of the wind turbine over the support structure to the tower.

The supports structure is prepared to transfer the loads and vibrations from the rotor of the wind turbine to the tower. The support structure is planned to last as long as the lifetime of the wind turbine. In this case a lifetime of more than 20 or 25 years is normal.

Thus the support structure needs to be planned rigid enough and needs to be machined with a minimum of faults and tolerances.

The support structure is usually a casted piece of metal. A support structure normally weighs between 10 and 60 tons. Metal pieces of the size of a support structure of a modern wind turbine are difficult to cast. Contraction cavities are a common problem that might occur in casted support structures of this size. In addition the support structure needs to be machined afterwards.

Over the last decade the planned maximum output power of wind turbines increased. In parallel the rotor diameter and the hub height of the wind turbines increased. Thus also the capabilities of the support structure needed to increase. The support structures were planned bigger and more massive.

The components of a wind turbine are normally manufactured in a production site and are then transported to the installation site of the wind turbine. Usually road transport is necessary for at least a part of the way. The size and weight of components that can be transported on a road are normally limited.

Support structures of a weight of more than 30 tons are rather difficult to transport. Thus the size of the support structure is limited. Thus the maximum size of a wind turbine is limited due to the possibilities for road transport.

SUMMARY

An aspect relates to providing an improved support structure to overcome the problems stated above.

A support structure of a wind turbine is disclosed, whereby the support structure comprises a first end to connect to a rotor of a wind turbine, and a second end to be connected to a tower of a wind turbine. The support structure comprises an intermediate part that connects the first end to the second end; and the intermediate part comprises the form of an elbow-shaped tube.

The support structure is divided into at least two segments, whereby the segments are transportable individually from a manufacturing site to a construction site. The segments are connectable in a way that the support structure is capable of transferring forces from the rotor to the tower.

The rotor of the wind turbine is connected to the support structure at a first end of the support structure.

The support structure is connected to the tower of the wind turbine at a second end of the support structure. The support structure supports the generator and the rotor of the wind turbine on the tower. In addition the support structure transfers forces from the rotor and the generator to the tower.

The first end of the support structure and the second end are connected by an intermediate part. The intermediate part shows the form of an elbow-shaped tube. The tube is not necessarily a tube with completely closed walls. The intermediate part can also comprise openings in the tube shaped wall, like doorways, for example.

The elbow-shaped form of the tube is referred to as a bent tube or sometimes as a swan-neck.

The connection area of the first end and the second end of the support structure, that are designed to connect to the rotor and to the tower, are positioned in an angle of close to, but less than 90°.

The manufacturing site is the site where the segments of the support structure are manufactured, for example. The manufacturing site can also be the site where parts of the wind turbine are assembled and prepared for further transport.

The construction site is the site, where the segments or the support structure are connected to form the support structure. Thus it can also be the site where the wind turbine is set up. It can also be a site in a harbor in the case of an offshore installation of the wind turbine, where a further transport of the parts of the wind turbine is necessary to reach the final site of operation of the wind turbine.

Forces are transferred over the support structure from the first end to the second end. These forces include the static weight of the generator and the rotor of the wind turbine, as well as wind forces acting on the rotor of the wind turbine. The forces also include vibrations and bending moments induced into the wind turbine by the wind.

The forces are transferred from the rotor and the generator to the support structure and from the support structure to the tower of the wind turbine.

The forces are transferred from the first end of the support structure to the second end. A part of the forces are transferred by the elbow-shaped tube-like form of the support structure.

The support structure is divided into segments. The segments of the support structure are manufactured individually and independently.

The segments are prepared to be connected by bolts, rivets, pins, or a combination thereof. To achieve a proper load transfer, the segments can be equipped with flanges of interlocking connections.

The segments are casted as single pieces and machined, for example. Casting bigger pieces increases the possibility of faults in the casted body. Thus casting segments, and thereby smaller entities, reduces the possibility of faults in the casted piece.

In addition the weight and the size of the segments are smaller than the size and the weight of the support structure as a whole.

Thus transportation of the segments is much easier than transportation of the complete support structure.

Furthermore, the limitations due to road transportation limit the size of the segments, and not the size of the support structure as a whole. Thus the support structure can be designed with a higher mass and with a bigger size than the limitations of road transportation would allow.

Thus the mass and size of the support structure are not limited due to the requirements of road transport. Thus also the capabilities of the support structure are not limited due to restrictions in mass or size.

Thus larger support structures and therefore larger wind turbines with a bigger rotor and a higher power output can be designed based on a support structure as described.

The first end comprises at least a part of a first segment.

The first end is the end of the support structure where the rotor of the wind turbine is attached to the support structure.

The first end comprises at least a part of the first segment. The first segment is thus designed and arranged to form the front side of the support structure. The support structure is divided into segments, whereby the division of the segments goes from one side of the segment to the other side of the segment soon from the front of the support structure.

The front side of the wind turbine is the side where the rotor is attached to the nacelle. This is equal to the first end of the support structure in a position as mounted to the tower.

Thus seen from the front of the support structure the segments are arranged consecutively starting with the first segment that includes the first end.

Thus the forces transferred through the support structure are induced from the rotor to the first segment, and from there to a second segment. Thus the connection area where the first and the second segment are connected is not arranged in parallel to the direction of the transfer of the forces.

Thus less shear forces arise at the connection area between the segments. Shear forces are problematic for a connection area as they can lead to a movement of one segment relative to the other segment. This movement is problematic for the connection means used to connect the segments. The lifetime of the connection means and thus of the connection between the segments is be reduced due to a movement of the segments in respect to each other.

Thus the lifetime of the connection between the segments is increased, when the forces transferred across the connection area between segments in a mainly vertical manner in respect to the connection surface of the segment.

Thus the lifetime of the support structure is increased and thus the lifetime of the wind turbine is increased.

The second end comprises at least a part of a second segment.

The second end of the support structure is prepared to be connected to the tower of the wind turbine.

The second end comprises at least a part of the second segment. The second segment is thus designed and arranged to form the tower-sided end of the support structure.

The segments are arranged consecutively seen from the first end of the support structure. The forces are transferred from the first segment to the second segment.

Thus the forces, transferred from the rotor into the support structure, are transferred through a connection area between the first segment and the second segment. The connection area between the segments is not in parallel to the main direction of the transfer of the forces.

Thus less shear forces act on the connection between the first segment and the second segment. Shear forces reduce the lifetime of the connection between parts.

Thus the lifetime of the connection between the first and the second segment is maximized.

The first segment comprises the first end of the support structure.

Thus the first segment comprises the complete first end. Thus the first end is not divided into two or more segments. Thus the first end is manufactured as one piece.

A component that is manufactured as one piece is more rigid than a component with the same mass that is manufactured in two pieces that are then combined.

Thus the first end, that is the interface to connect the rotor to the support structure, is more rigid.

The second segment comprises the second end of the support structure.

The second end of the support structure is a part of the second segment. The second end of the support structure is often referred to as the base plate. The base plate is the interface plate between the support structure and the tower. It comprises constructional elements to mount at least one yaw motor to the base plate.

The base plate, or the second end of the support structure, needs to be quite rigid to transfer the forces from the support structure to the tower. Any division in the base plate could limit the capabilities of the base plate and thus the lifetime of the wind turbine.

The second segment comprises the base plate. Thus the base plate is formed or casted as one piece. Thus the base plate, or the second end of the support structure, does not show a division. Thus the base plate is more rigid, and the capabilities of the support structure are improved.

The support structure comprises at least one third segment that comprises at least a part of the intermediate part, and that is connected to the first segment and to the second segment so that forces from the rotor are transferred over the third segment.

A third segment comprises at least a part of the intermediate part of the support structure. The third segment is connected to both the first segment and the second segment.

At least a part of the forces acting on the first end of the support structure are transferred from the first end to the second end via the elbow-shaped tube of the intermediate part.

Thus a part of the forces are transferred over the third segment of the support structure.

The overall weight of the support structure is then distributed on three segments. Also the size of the segments can be reduced even further. Thus overall size and weight of the support structure can be increased by using three segments.

The third segment comprises at least two parts that are connected to the first segment and to the second segment.

The third segment is divided into two parts. The division of the third segment can be performed along a vertical plane so that the third segment is divided into a right and a left half-shell of the third segment seen from the front of the support structure.

The front side of the wind turbine is the side where the rotor is attached to the nacelle. This is equal to the first end of the support structure in a position as mounted to the tower.

The first segment comprises at least two parts that are connected to the rotor and to the second segment.

The first segment, that comprises the first end of the support structure, comprises two parts. This can be a right and left part, or an upper or a lower part.

Thus the size and the mass of the parts or the first segment of the support structure are even further reduced. Thus it is easier to cast and to transport the parts forming the first segment of the support structure.

At least one of a first segment, a second segment, or a third segment of the support structure is made of casted material.

A casted part shows a high stiffness and durability. At least one of the segments of the support structure is made as a casted part. Thus the segment shows a high stiffness and durability.

The different segments of the support structure can be constructed and manufactured with different materials. This could be a different kind of steel with different properties regarding elasticity.

Thus the different segments of the support structure can be designed in an optimized way to fulfill their purpose.

The first segment comprises a part of the first end and a part of the second end, and the second segment comprises a part of the first end and a part of the second end.

The first segment comprises a part of the first end and a part of the second end. Thus the first segment is a longitudinal segment reaching from the first end to the second end.

Also the second segment comprises a part of the first end and a part of the second end. Thus also the second segment is a longitudinal segment that goes from the first end of the support structure to the second end of the support structure.

Thus the support structure is divided along a vertical plane into a right and a left half, seen from the front. Thus the two segments can also be referred to as two half shells of the support structure.

Thus the segments of the support structure show only half the width of the support structure itself. The width of a part might be limited due to the requirements of road transport.

Thus the size of the support structure is not limited by the requirements of road transport. The support structure can be constructed to show around double the width than the two segments that are connected to form the support structure.

In addition a segment of the support structure shows only around half the weight than the support structure itself. Thus the weight of the support structure as a whole can be about double the weight that is transportable by a vehicle on road.

The support structure is prepared and arranged in a way to connect a generator of a direct driven wind turbine to the support structure.

In a direct driven wind turbine the rotor of the wind turbine is directly connected with the generator without the use of a gearbox.

The first end is prepared and arranged in a way to connect a generator of a direct driven wind turbine to the support structure.

The rotor of the wind turbine is connected to the generator of the wind turbine and the generator is connected to the first end of the wind turbine.

A segment is disclosed, to be used in a support structure.

This can be at least one of a first segment, a second segment or a third segment.

The segment is a part of the support structure and is therefore smaller and lighter than the complete support structure. Thus the segment is easier to transport than the support structure as a whole.

Thus the size of the segment is limited by the requirements for road transportation, but the support structure itself is not limited by the requirements for road transportation.

A method for manufacturing a support structure for a wind turbine is disclosed, whereby the support structure comprises a first end to connect to a rotor of the wind turbine, and a second end to be connected to a tower of a wind turbine. The support structure comprises an intermediate part that connects the first end to the second end, and the intermediate part comprises the form of an elbow-shaped tube. The support structure is divided into at least two segments. The method comprises the steps of transporting the segments individually from a manufacturing site to a construction site, and connecting the segments in a way that the support structure is capable of transferring forces from the rotor to the tower.

Thus the segments are transported separately to the construction site. This can be the construction site of the support structure or of the nacelle. It can also be the construction site of the wind turbine itself.

The segments are connected to each other in a fixed manner. This can also be a fixed but detachable manner. The segments are connected after the part of the transportation that is critical in terms of transportation restrictions. This can be after the road transportation that is limited in respect to size and weight of the single items transported.

Thus the connection can be performed after the segments were transported by road into a harbor, and before the transportation by ship, for example. The harbor is then the construction site of the support structure.

BRIEF DESCRIPTION

Some of the embodiments will be described in detail, with reference to the following figures, wherein like designations denote like members, wherein:

FIG. 2 shows an embodiment of the completed support structure; and

FIG. 3 shows a further view of an embodiment of the segmented support structure.

DETAILED DESCRIPTION

Figure 1:
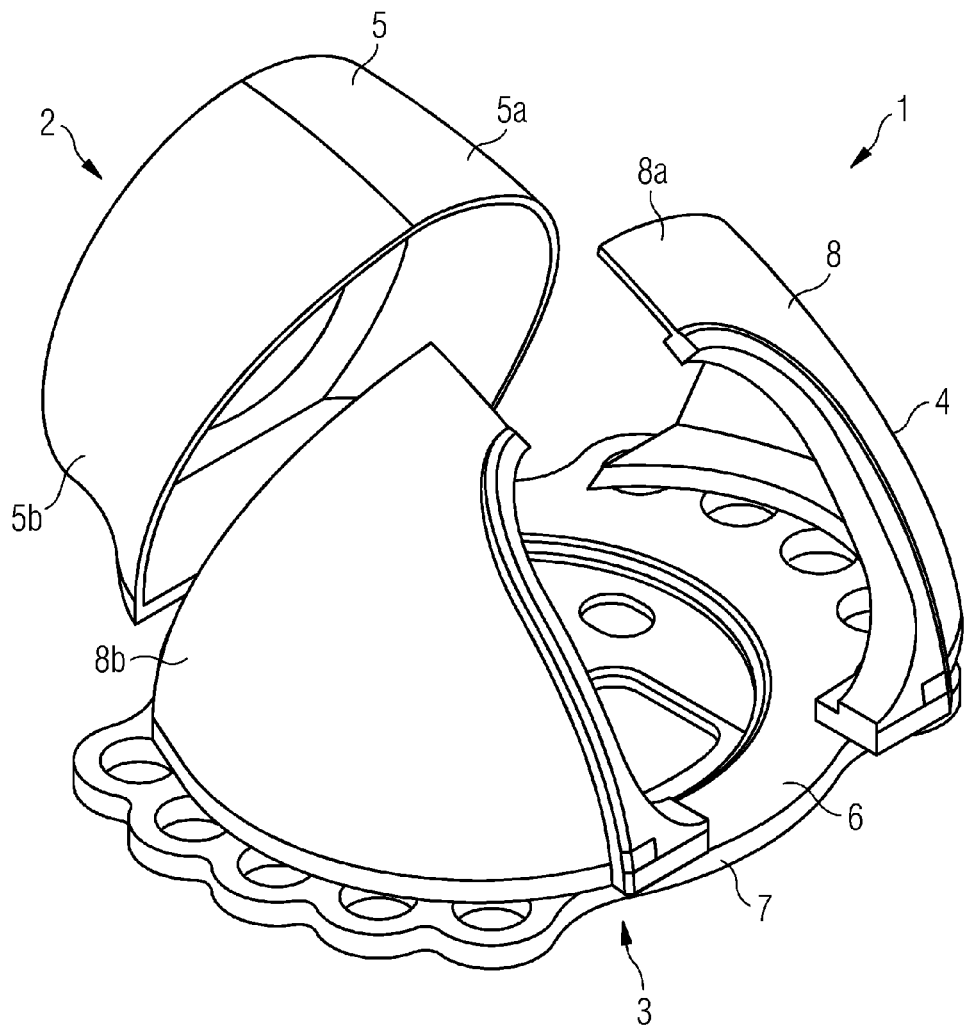
FIG. 1 shows an embodiment of a support structure of a wind turbine.

FIG. 1 shows a support structure 1 of a wind turbine. The support structure 1 comprises a first end 2 and a second end 3. An intermediate part 4 connects the first end 2 and the second end 3 of the support structure 1.

The intermediate part 4 comprises the form of an elbow-shaped tube. This can also be described as a bended tube or a swan neck.

The first end 2 is prepared in a way to connect a rotor of a wind turbine to the first end 2. In the case of a direct driven wind turbine, the rotor is attached to the generator of the wind turbine, and the generator is connected attached to the first end 2. The second end 3 of the support structure 1 is prepared to be connected to a tower of a wind turbine.

The support structure 1 is connected rotatable to the tower of the wind turbine. Thus, the support structure 1 is capable to perform a yaw movement on top of the tower. The support structure 1 shows a base plate 7 that is also referred to as a yaw section. This base plate 7 shows cut-outs to install yaw motors to the yaw section of the support structure 1.

The support structure 1 supports the electric generator of the wind turbine on top of the tower. In addition, the support structure 1 transfers forces from the rotor to the support structure to the tower of the wind turbine.

The support structure 1 in FIG. 1 is segmented. A first segment 5 comprises the first end 2 of the support structure 1.

A second segment 6 comprises the second end 3 of the support structure 1.

A third segment 8 comprises the intermediate part 4. The third segment 8 is further divided into two parts 8a and 8b.

The support structure 1 of the wind turbine is segmented into several parts. Thus, also the overall mass of the support structure is divided into smaller partitions. The parts and segments of the support structure 1 are easier to transport than the complete support structure 1.

The first segment 5 comprises a connection area to connect the first segment 5 to the third segment 8. The third segment 8 also comprises a connection area to be connected to the first segment 5.

The connection area of the first segment 5 is mainly parallel to the connection area of the first end 2 where the rotor is connected to the support structure 1. Thus, the forces induced into the support structure are transferred from the first segment 5 to the third segment 8 over a connection area that is mainly parallel to the first end 2 of the support structure 1.

Thus, the forces are transferred over the connection area between the first segment 5 and the third segment 8 in a mainly vertical manner in respect to the connection area. Thus, the transfer of the forces does not lead to shear forces in the connection area between the first segment 5 and the third segment 8.

The intermediate part 4 of the support structure 1 is divided into two parts 8a and 8b of the third segment 8. The division between the first part 8a and the second part 8b is mainly longitudinal to the support structure 1 and divides the third part 8 into a right and left half-shell of the intermediate part 4 seen from the front of the support structure 1. The front of the support structure 1 is the perspective seen from the side of the rotor that is connected to the first end 2 of the support structure 1, so seen from the first end 2.

The two half-shells 8a and 8b of the intermediate part 4 comprise a connection area to connect to the second segment 6 of the support structure 1. The second segment 6 comprises the base plate 7 that forms the yaw section that is later connected to the tower of the wind turbine at the second end 3 of the support structure 1.

FIG. 2 shows the completed support structure.

FIG. 2 shows a support structure 1 in a completed form. Thus, all the segments and parts of the support structure 1 are connected.

The support structure 1 comprises a first end 2 where the rotor is later connected to the support structure, and a second end 3 that is later connected to the tower of the wind turbine. The first end 2 and the second end 3 of the support structure 1 are connected by an intermediate part 4 that shows the form of an elbow-shaped tube.

The tube-like shape of the intermediate part 4 is not completely closed. It comprises openings, such as doorways and holes to install cables.

The support structure 1 comprises a first segment 5 and a second segment 6. The first segment 5 and the second segment 6 are connected.

Forces that are induced into the wind turbine through the rotor of the wind turbine are transferred from the rotor of the wind turbine through the rotor of the wind turbine into the support structure 1. Thus, the forces are induced into the support structure 1 through the first end 2 and are transferred through the support structure 1 to the tower of the wind turbine through the second end 3.

The first segment 5 and the second segment 6 are connected in a way that the forces can be transferred from the first end 2 to the second end 3. The support structure 1 comprises a third segment 8, whereby the third segment 8 comprises the intermediate part 4 of the support structure 1.

Forces induced at the first end 2 into the support structure 1 are also transferred over the intermediate part 4, thus over the third segment 8 to the second end 3 of the support structure.

The first segment 5 is further divided into two parts 5a and 5b. Also, the third segment 8 is further divided into a first part 8a and a second part 8b. The division into a first part 5a, 8a and a second part 5b, 8b of the first segment 5 and the third segment 8 is designed as a longitudinal division. Thus, the first segment 5 and the second segment 8 are divided into a right part and a left part seen from the front of the wind turbine.

The first segment 5 is connected to the second segment 6 and to the third segment 8. The second segment 6 is connected to the first segment 5 and to the third segment 8. The third segment 8 comprises a connection to the first segment 5 and the second segment 6.

The second segment 6 comprises the base plate 7 that forms the yaw section of the support structure 1. The base plate 7 comprises openings to mount yaw motors to the base plate 7.

FIG. 3 shows a further view of the segmented support structure.

FIG. 3 shows the segments 5, 6, 8 of the support structure 1. The support structure 1 of the wind turbine is segmented into a first segment 5, a second segment 6 and a third segment 8.

The third segment 8 is divided into two parts 8a and 8b. The first end 2 of the support structure 1 comprises at least a part of the first segment 5. The second end 3 of the support structure 1 comprises at least a part of the second segment 6.

The second segment 6 comprises the base plate 7 of the support structure 1. The base plate 7 of the support structure 1 is designed in a way to allow the yaw movement of the nacelle of the wind turbine in respect to the tower.

To allow a motorized yaw movement, the base plate 7 shows ten round openings to mount motors to the base plate. In addition, the base plate shows several openings like manholes and openings for cables.

The first segment 5, the second segment 6, and the third segment 4 are capable to be connected to form the support structure 1.

The first segment 5 is connected to the second segment 6. In addition, the third segment 8 is connected to the first segment 5 and to the second segment 6.

The segments are connected in a way that forces can be transferred from the first segment 5 to the second segment 6 and also from the first segment 5 through the third segment 8 to the second segment 6.

The segments of the support structure 1 are smaller and more lightweight than the complete support structure 1. Thus, the segments are easier to transport than the complete support structure 1.

The segments of the support structure 1 are transported from a manufacturing site to a construction site separately and are combined at the construction site to form the support structure 1.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A support structure of a wind turbine comprising:
    a first segment having an end that defines a first end of the support structure, the end of the first segment configured to connect to a rotor of the wind turbine;
    a second segment defining a second end of the support structure, the end of the second segment configured to connect a tower of the wind turbine; and
    an intermediate part that connects the first segment to the second segment, the intermediate part including a form of an elbow-shaped tube;
    wherein the intermediate part is divided into two segments, the two segments being transportable individually from a manufacturing site to a construction site, and connectable in a way that the support structure is capable of transferring forces from the rotor to the tower.

2. The support structure according to claim 1, wherein the first segment comprises at least two parts that are configured to connect to the rotor and to the second segment.

3. The support structure according to claim 1, wherein the first segment, the second segment or the intermediate part of the support structure is made of casted material.

4. The support structure according to claim 1, wherein the support structure is prepared and arranged in a way to connect a generator of a direct driven wind turbine to the support structure.

5. The support structure according to claim 4, wherein the first end is prepared and arranged in a way to connect the generator of the direct driven wind turbine to the support structure.

* * * * *